(12) United States Patent
O'Halloran et al.

(10) Patent No.: US 11,500,558 B2
(45) Date of Patent: Nov. 15, 2022

(54) DYNAMIC STORAGE DEVICE SYSTEM CONFIGURATION ADJUSTMENT

(71) Applicant: EMC IP Holding Company LLC, Hopkinton, MA (US)

(72) Inventors: Brian O'Halloran, Carrigaline (IE); Paul Bradley, Macroom (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 134 days.

(21) Appl. No.: 16/751,754

(22) Filed: Jan. 24, 2020

(65) Prior Publication Data

US 2021/0232332 A1 Jul. 29, 2021

(51) Int. Cl.
*G06F 3/06* (2006.01)
*G06N 20/00* (2019.01)

(52) U.S. Cl.
CPC .......... *G06F 3/0632* (2013.01); *G06F 3/0604* (2013.01); *G06F 3/0673* (2013.01); *G06N 20/00* (2019.01)

(58) Field of Classification Search
CPC ...... G05B 13/00–048; G05B 15/00–02; G05B 17/00–02; G06F 1/00–3296; G06F 3/00; G06F 3/06–0689; G06F 5/00–16; G06F 8/00–78; G06F 9/00–548; G06F 11/00–3696; G06F 12/00–16; G06F 13/00–4295; G06F 15/00–825;
(Continued)

(56) References Cited

U.S. PATENT DOCUMENTS 6,377,907 B1* 4/2002 Waclawski .......... G06F 11/3452
703/2
7,343,459 B2* 3/2008 Prahlad ................. G06F 3/0481
707/999.204
(Continued)

OTHER PUBLICATIONS

Definition of "periodically"; Merriam-Webster; Oct. 11, 2016; retrieved from https://web.archive.org/web/20161011041318/https://www.merriam-webster.com/dictionary/periodically on Mar. 28, 2022 (Year: 2016).*
(Continued)

*Primary Examiner* — Daniel C. Chappell
(74) *Attorney, Agent, or Firm* — Krishnendu Gupta; Nikhil Patel

(57) ABSTRACT

Embodiments of the present disclosure relate to dynamically adjusting storage device system configurations. Information from one or more storage devices is collected. Dynamic adjustment of each storage device's system configuration is enabled based on the information. The information can include performance data, telemetry data, system configuration data, component configuration data, change events/commands, and/or alerts. Each storage device's components can be monitored with at least one daemon. Information patterns can be identified. The patterns can be matched to spikes in data traffic and/or storage device performance. The matched patterns and spikes can be correlated with each storage device's performance and errors. Storage device system configuration adjustment options can be determined. Rules for each option can be generated. Dynamic adjustment of each storage device's system configuration based on the generated one or more rules can be enabled.

18 Claims, 4 Drawing Sheets

(58) Field of Classification Search
CPC ....... G06F 16/00–986; G06F 17/00–40; G06F 21/00–88; G06F 2009/3883; G06F 2009/45562–45595; G06F 2015/761–768; G06F 2201/00–885; G06F 2206/00–20; G06F 2209/00–549; G06F 2211/00–902; G06F 2212/00–7211; G06F 2213/00–4004; G06F 2216/00–17; G06F 2221/00–2153; G06K 9/00–82; G06N 3/00–126; G06N 5/00–048; G06N 7/00–08; G06N 10/00; G06N 20/00–20; G06N 99/00–007

See application file for complete search history.

(56) References Cited

U.S. PATENT DOCUMENTS

| | | | | |
|---|---|---|---|---|
| 7,613,752 | B2* | 11/2009 | Prahlad | G06F 3/0605 |
| 7,975,061 | B1* | 7/2011 | Gokhale | G06F 3/0683 |
| | | | | 709/239 |
| 8,117,235 | B1* | 2/2012 | Barta | G06F 3/061 |
| | | | | 707/802 |
| 9,111,219 | B1* | 8/2015 | Mohla | G06N 5/04 |
| 10,521,832 | B2* | 12/2019 | Zhu | G06Q 30/0277 |
| 2005/0120109 | A1* | 6/2005 | Delic | H04L 43/00 |
| | | | | 709/224 |
| 2007/0198797 | A1* | 8/2007 | Kavuri | G06F 3/0653 |
| | | | | 711/165 |

OTHER PUBLICATIONS

Y. Hirashima, K. Yamasaki and M. Nagura, "Proactive-Reactive Auto-Scaling Mechanism for Unpredictable Load Change," 2016 5th IIAI International Congress on Advanced Applied Informatics (IIAI-AAI), 2016, pp. 861-866, doi: 10.1109/IIAI-AAI.2016.180. (Year: 2016).*

R. Maarefdoust and S. Rahati, "Traffic Modeling with Multi Agent Bayesian and Causal Networks and Performance Prediction for Changed Setting System," 2010 Second International Conference on Machine Learning and Computing, 2010, pp. 17-21, doi: 10.1109/ICMLC.2010.34. (Year: 2010).*

F. Kalim et al., "Caladrius: A Performance Modelling Service for Distributed Stream Processing Systems," 2019 IEEE 35th International Conference on Data Engineering (ICDE), 2019, pp. 1886-1897, doi: 10.1109/ICDE.2019.00204. (Year: 2019).*

J. P. R. Fernandes, J. A. D. Massignan, J. B. A. London and R. Z. Fanucchi, "Very Short-Term Current and Load Forecasting for Distribution Systems in Data Constrained Situations," 2021 IEEE Madrid PowerTech, 2021, pp. 1-6, doi: 10.1109/PowerTech46648.2021.9494833. (Year: 2021).*

* cited by examiner

DYNAMIC STORAGE DEVICE SYSTEM CONFIGURATION ADJUSTMENT

BACKGROUND

A storage area network (SAN) is a dedicated high-speed network that interconnects and presents shared pools of storage devices to multiple servers. A SAN moves storage resources off common user networks and reorganizes them into an independent, high-performance network. This enables each server to access shared storage as if it were a drive directly attached to the server. Accordingly, host devices can send block-based access requests to access any storage device on the SAN.

A SAN is typically assembled using three principle components: cabling, host bus adapters (HBAs), and switches attached to storage arrays and servers. Each switch and storage system on the SAN are usually interconnected, and physical interconnections generally support bandwidth levels that can adequately handle peak data activities.

SUMMARY

One or more aspects of the present disclosure relates to dynamic storage device system configuration adjustment. Information from one or more storage devices is collected. Dynamic adjustment of each storage device's system configuration is enabled based on the information.

In embodiments, the information can include performance data, telemetry data, system configuration data, component configuration data, change events/commands, and/or alerts.

In embodiments, each storage device's components can be monitored with at least one daemon.

In embodiments, the storage device components can include one or more of: memory, cache, processors, amongst other storage device components.

In embodiments, information patterns can be identified. The patterns can be matched to spikes in data traffic and/or storage device performance.

In embodiments, the matched patterns and spikes can be correlated with each storage device's performance and errors. Storage device system configuration adjustment options can be determined based on the correlation. Rules for each option can be generated. Dynamic adjustment of each storage device's system configuration based on the generated one or more rules can be enabled.

In embodiments, the information can be normalized to identify the information patterns.

In embodiments, each data type included in the information can be identified to normalize the information. Further, information corresponding to each data type can be transformed into a predetermined format to normalize the information.

In embodiments, one or more machine learning techniques can be performed to the normalized information.

In embodiments, the information can be segmented to identify the information patterns. The information can be segmented based on one or more of: time windows, industry of customers associated with each storage device, configuration changes to any storage device component, event notifications, data transfer spikes, and alert notifications, amongst other segmentation parameters.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
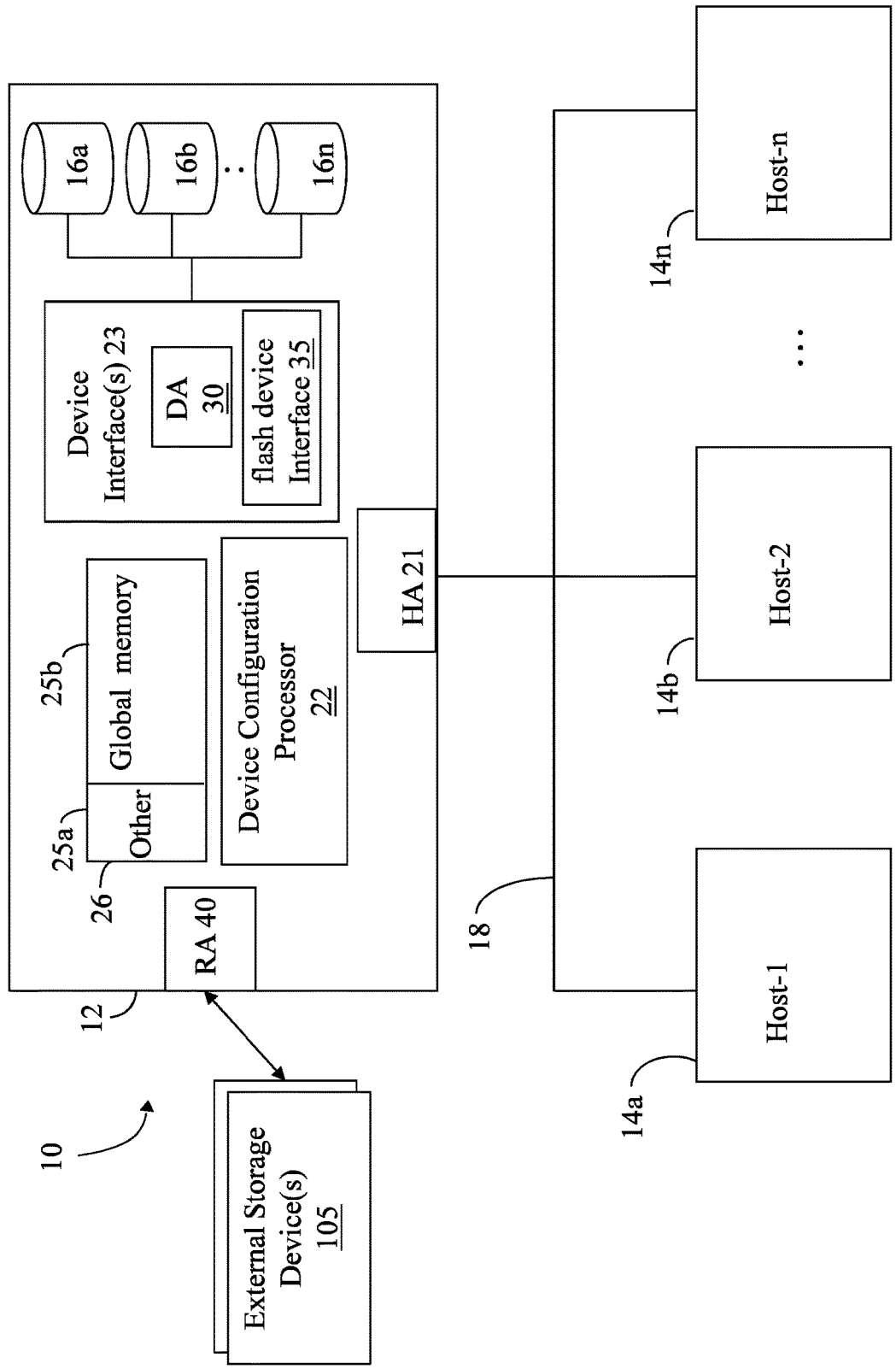
FIG. 1 is a block diagram of an example a storage system in accordance with example embodiments disclosed herein.

Each customer of storage devices such as those implemented as part of a storage area network (SAN) have unique data storage requirements and corresponding performance requirements (e.g. response time expectations). Accordingly, each customer may purchase storage devices having system configurations designed to meet those requirements.

During live operation of the storage devices, customers may make changes to their respective storage device system configurations. In other examples, the customers may have miscalculated their data storage requirements and corresponding performance requirements. As such, the device's changed and/or original system configurations may not meet each customer's actual data storage requirements and corresponding performance requirements. Accordingly, the customers may attempt to adjust their respective storage device system configurations. However, the changes may result in unanticipated performance degradation of their storage devices and/or device errors.

Embodiments of the present disclosure relate to enabling dynamic adjustments (e.g., actual and/or recommended) to storage device system configurations to prevent and/or rapidly address performance and errors of a customer's storage device. The dynamic and/or recommend adjustments can be based on data collected from the customer's storage device and one or more of a plurality of storage devices. The one or more of a plurality of storage devices can correspond to multiple other customers operating across one or more industries. By using large amounts of data sets, the embodiments can provide dynamic and/or recommend adjustment solutions with statically accuracy that can be orders of magnitude greater than current storage device management solutions To provide the dynamic and/or recommend adjustments, the embodiments can monitor storage devices of a particular customer and one or more additional customers to collect a wide array of data (e.g. storage device telemetry data), both real-time/current and historical. The embodiments can use the data to identify sequences of, e.g., one or more of device/component changes, command history, events, performance changes (e.g., performance spikes), and alerts/notifications of the monitored storage devices. The identified sequences can correspond to unfavourable performance metric of the storage device, storage device components, and/or storage device/device component error conditions. For example, the embodiments can monitor and analyze storage device telemetry data such as component performance profiles, component action records, and component event records to identify the sequences.

Using the identified sequences, the embodiments can generate one or more system configuration rules to predict unfavourable performance on storage device components and/or error conditions to the components in response to any storage device changes, user requested changes, and storage device traffic spikes. For instance, the embodiments can analyze and find patterns of configuration events/changes and match the patterns with spikes in data traffic. The embodiments can correlate the matches to performance and/or error scenarios that arise on a monitored storage device. To provide greater statistical accuracy, the embodiments can monitor a plurality of storage devices that are both in used in a field of operation by, e.g., a storage device customer and/or one or more lab operated storage devices. The customers can correspond to a wide variety of industries and, as such the collected data can correspond to vast amounts of different operational environments in which any given storage device can be used.

Additionally, the rules can be grouped into one or more sets of rules, where each set relates to a distinct category of storage device changes, user requested changes, and storage device traffic spikes. The categories can be identified using one or more machine learning techniques that can both identify the sequences and group related sequences. Accordingly, the embodiments can associate related sequences with a unique category defining the sequences. The category can be user defined and/or dynamically defined based on system configuration and/or performance parameters related to each sequence.

Using the identified sequences and rules, the embodiments can, advantageously, advise customers, in real-time, of any potential storage device issues. For example, issues arising from customer attempted changes to their storage device system configuration. Similarly, the embodiments can rapidly address any issues by dynamically adjusting, in real-time, to storage device system configurations in response to any condition resulting in storage device performance degradation and/or errors.

Referring to FIG. 1, an example system 10 includes a data storage system 12 connected to host systems 14a-14n through communication medium 18. In embodiments, the hosts 14a-14n can access the data storage system 12, for example, to perform input/output (I/O) operations or data requests. The communication medium 18 can be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network (including a Storage Area Network (SAN)) or other wireless or other hardwired connection(s) by which the host 14a-14n can access and communicate with the data storage system 12. The hosts 14a-14n can also communicate with other components included in the system 10 via the communication medium 18.

Each of the hosts 14a-14n and the data storage system 12 can be connected to the communication medium 18 by any one of a variety of connections as may be provided and supported in accordance with the type of communication medium 18. The processors included in the hosts 14a-14n may be any one of a variety of proprietary or commercially available single or multi-processor system, such as an Intel-based processor, or other type of commercially available processor able to support traffic in accordance with each embodiment and application.

It should be noted that the examples of the hardware and software that may be included in the data storage system 12 are described herein in more detail and can vary with each embodiment. Each of the hosts 14a-14n and data storage system 12 can all be located at the same physical site or can be located in different physical locations. Examples of the communication medium 18 that can be used to provide the different types of connections between the host computer systems and the data storage system of the system 10 can use a variety of different communication protocols such as SCSI, Fibre Channel, iSCSI, and the like. Some or all the connections by which the hosts 14a-14n and data storage system 12 can be connected to the communication medium may pass through other communication devices, such switching equipment that may exist such as a phone line, a repeater, a multiplexer or even a satellite.

Each of the hosts 14a-14n can perform different types of data operations in accordance with different types of tasks. In embodiments, any one of the hosts 14a-14n may issue a data request to the data storage system 12 to perform a data operation. For example, an application executing on one of the hosts 14a-14n can perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the embodiments herein such as external storage device(s) 105. It should also be noted that an embodiment may include data storage arrays or other components from one or more vendors. In subsequent examples illustrated the embodiments herein, reference may be made to a single data storage array by a vendor, such as by DELL Technologies of Hopkinton, Mass. However, as will be appreciated by those skilled in the art, the embodiments herein are applicable for use with other data storage arrays by other vendors and with other components than as described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. The embodiments described herein can be used in an embodiment in which one or more of the devices 16a-16n are flash drives or devices. More generally, the embodiments herein may also be used with any type of SSD although following paragraphs can refer to a particular type such as a flash device or flash memory device.

The data storage array 12 may also include different types of adapters or directors, such as an HA 21 (host adapter), RA 40 (remote adapter), and/or device interface 23. Each of the adapters HA 21, RA 40 may be implemented using hardware including a processor with local memory with code stored thereon for execution in connection with performing different operations. The HA 21 may be used to manage communications and data operations between one or more host systems 14a-14n and the global memory (GM) 25b. In an embodiment, the HA 21 may be a Fibre Channel Adapter (FA) or another adapter which facilitates host communication. The HA 21 may be characterized as a front-end component of the data storage system 12 which receives a request from one or more of the hosts 14a-14n. The data storage array 12 can include one or more RAs (e.g., RA 40) that may be used, for example, to facilitate communications between data storage arrays (e.g., between the storage array 12 and the external storage device(s) 105). The data storage array 12 may also include one or more device interfaces 23 for facilitating data transfers to/from the data storage devices 16a-16n. The data storage interfaces 23 may include device interface modules, for example, one or more disk adapters (DAs) 30 (e.g., disk controllers), flash drive interface 35, and the like. The DA 30 can be characterized as a back-end component of the data storage system 12 which interfaces with the physical data storage devices 16a-n.

One or more internal logical communication paths may exist between the device interfaces 23, the RAs 40, the HAs 21, and the memory 26. An embodiment, for example, may use one or more internal busses and/or communication modules. For example, the global memory 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The data storage system as described in this embodiment, or a device thereof, such as a disk or aspects of a flash device, should not be construed as a limitation. Other types of commercially available data storage systems, as well as processors and hardware controlling access to these devices, may also be included in an embodiment.

Host systems 14a-14n provide data and access control information through channels to the storage systems 12, and the storage systems 12 may also provide data to the host systems 14a-14n also through the channels. The host systems 14a-14n do not address the drives or devices 16a-16n of the storage systems directly, but rather access to data can be provided to one or more host systems 14a-n from what the host systems view as a plurality of logical devices or logical volumes (LVs). The LVs may or may not correspond to the actual physical devices or drives 16a-16n. For example, one or more LVs may reside on a single physical drive or multiple drives. Data in a single data storage system, such as a single data storage array 12, may be accessed by multiple hosts allowing the hosts to share the data residing therein. The HA 21 may be used in connection with communications between a data storage array 12 and one or more of the host systems 14a-n. The RA 40 may be used in facilitating communications between two or more data storage arrays (e.g., device 12 and external device(s) 105). The DA 30 may be one type of device interface used in connection with facilitating data transfers to/from the associated disk drive(s) 16a-n and LV(s) residing thereon. A flash device interface 35 may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA 30, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA 30 that accomplishes the foregoing by creating job records for the different LVs associated with a device. These different job records may be associated with the different LVs in a data structure stored and managed by each device interface.

A device configuration processor 22 can dynamically adjust and/or provide recommendations for adjustments to storage device system configurations. The embodiments, the processor 22 can monitor the storage device 12 to collect a wide array of data (e.g. storage device telemetry data), both real-time/current and historical, to make and/or provide recommended storage device configuration adjustments. Similarly, the processor 22 can receive similar data from the external storage device(s) 105. By analyzing the data, e.g., using one or more machine learning techniques, the processor 22 can identify sequences of, e.g., one or more of changes, events, and performance spikes of the storage device 12 and/or the external storage device(s) 105. In embodiments, the machine learning (ML) techniques can include a recurring neural network (RNN), amongst other known or yet to be known ML techniques. Based on the identified sequences, the processor 22 can further generate one or more rules to dynamically adjust and/or provide recommendations for adjustments to storage device system configurations as described in greater detail herein.

Although the device configuration processor 22 is depicted within the system 12, it should be noted that a device configuration processor 22 may exist external to the data storage system 12. Accordingly, the processor 22 may communicate with the data storage system 12 using any one of a variety of communication connections. In one embodiment, the device configuration processor 22 may communicate with the data storage system 12 through three different connections, a serial port, a parallel port and using a network interface card, for example, with an Ethernet connection. Using the Ethernet connection, for example, a device configuration processor may communicate directly with DA 30, HA 21, and/or RA 40 of the data storage system 12. In other embodiments, the device configuration processor 22 may be implemented via a cloud-based hosted solution (e.g., remote server) that communicates with the system 12 and/or the external storage device(s) 105 via a network (e.g., Internet, local area network (LAN), wide area network (WAN), amongst others).

Figure 2:
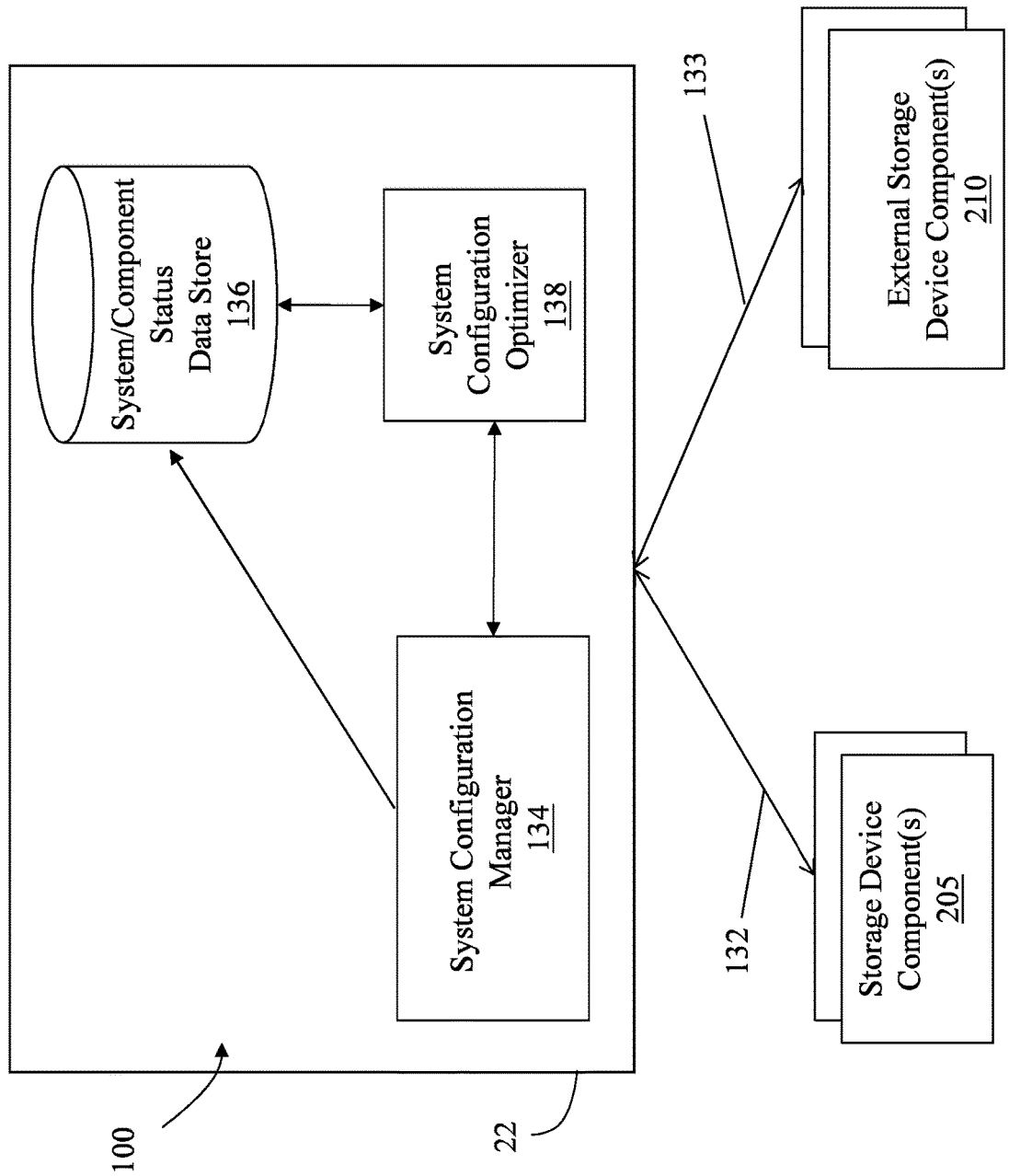
FIG. 2 is a block diagram of an example device configuration processor in accordance with example embodiments disclosed herein.

Referring to FIG. 2, a device configuration processor 22 of a storage device (e.g., device 12 of FIG. 1) can include elements 100 (e.g., software and hardware elements). It should be noted that the device configuration processor 22 may be any one of a variety of commercially available processors, such as an Intel-based processor, and the like. In embodiments, the device configuration processor 22 can be a parallel processor such as a graphical processing unit (GPU). Although what is described herein shows details of software that may reside in the device configuration processor 22, all or portions of the illustrated components may also reside elsewhere such as on, for example, HA 21, DA 30, RA 40 of FIG. 1, or a cloud hosted solution (e.g., a remote server) (not shown).

One of the elements 100 can include a system configuration manager 134. The manager 134 can collect data from the storage device and its components 205 via connection 133 (e.g., a Fibre channel). The components 205 can include any of the elements 16a-b, 21-23, 25a-b, 26, 30, 35, and 40 of device 12 depicted in FIG. 1, amongst other known storage device components. Additionally, the manager 134 can receive component data corresponding to one or more external device components 210 via connection 134 (e.g., over a communication network). The manager 134 can store the data in data store 136. In embodiments, the collected data can be real-time and/or historical storage device telemetry data.

The manager 134 can store the data using one or more data normalizing techniques. For example, the data normalizing technique can include identifying each data type included in the collected storage device telemetry data. The technique can further generate predetermined template formats for each data. Thus, in response to receiving the telemetry data, the manager 134 can transform each piece of data into a predetermined format corresponding to the data's data type.

A system configuration optimizer 138 can analyze the collected system telemetry data to identify patterns and/or sequences. In embodiments, the patterns and/or sequences can include those related to at least one or more of: component performance, configuration events/changes, storage device system configurations over time, command history, and change events. For example, the optimizer 138 can analyze timestamps associated with each piece of data to determine patterns and/or changes over time. Using the determined patterns and/or changes over time, the optimizer 138 can correlate performance changes of storage device components for which data may not be collected with performance changes of those components for which data is collected. For example, related components (e.g., those components physically neighboring each other in the storage device) may have similar performance changes and, as such, the manager 134 may select a subset of those related components to monitor to conserve storage device resources (e.g., memory and processing resources).

In embodiments, components can be related if they fall into one or more of the following categories: application (storage group) data (e.g., application masking views, port groups, initiator groups, and storage group components (i.e., groups, ports, amongst other storage device components)), port group data (e.g., masked applications for each port group and each director/port on each port group), initiator group data (e.g., masked applications for each initiator group and each initiator of each initiator group), remote replication association data (e.g., array remote replication groups, directors/ports for each remote replication group, remote replication usage mode), overall storage device capacity usage data (e.g., SCSI RDMA Protocol (SRP) usage and metadata usage, amongst other usage data).

Using the performance data and/or the identified patterns/sequences, the optimizer 138 can generate profiles (e.g., performance predictive models) for the storage device and/or each device component. Each profile can include information related to its corresponding components behavior in response to at least one or more of the following storage device occurrences: changes, events, and performance spikes of the storage device. For example, the profile can include component performance metrics and corresponding timestamps of those metrics. Accordingly, the optimizer 138 can match the metric timestamps with timestamps of each storage device occurrence. Further, the optimizer 138 can correlate the matches with performance and/or error scenarios that arise on the storage device. As such, the optimizer 138 can identify cause and effect data (e.g., those storage occurrences that result in storage device and/or component performance degradation as described in greater detail herein.

Accordingly, each profile identifies causal data and effect data (e.g., those storage device occurrences resulting in storage device and/or device component performance degradation and/or error). The optimizer 138 can generate a predictive performance model that correlates each profile to provide a holistic view of the storage device. Because performance degradation and/or errors may not manifest within a known time in response to a device occurrence, the optimizer 138 may generate storage device and/or device component profiles that span different time windows. Thus, the optimizer 138 can combination of profiles to identify performance degradations and/or errors resulting from device occurrences taking place at different time windows. For example, the optimizer 138 can generate rules using one or more profiles (and different combinations thereof) that, when executed, provide dynamic and/or recommend adjustments in response to one or more of: a customer requested storage system configuration change and monitored storage device occurrences.

In embodiments, the optimizer 138 can validate an integrity (e.g., precision and accuracy) of any set of profiles and/or rules using one or more validation techniques. For example, the validation technique can include injecting known failure scenarios as inputs into one or more of the profiles/rules to determine if the rules/profiles correctly predict outcomes that the optimizer 138 expects to receive. For example, the known failure scenarios and corresponding outcomes may have been collected/observed from one or more field-operational storage devices and used as the validation input.

Figure 3:
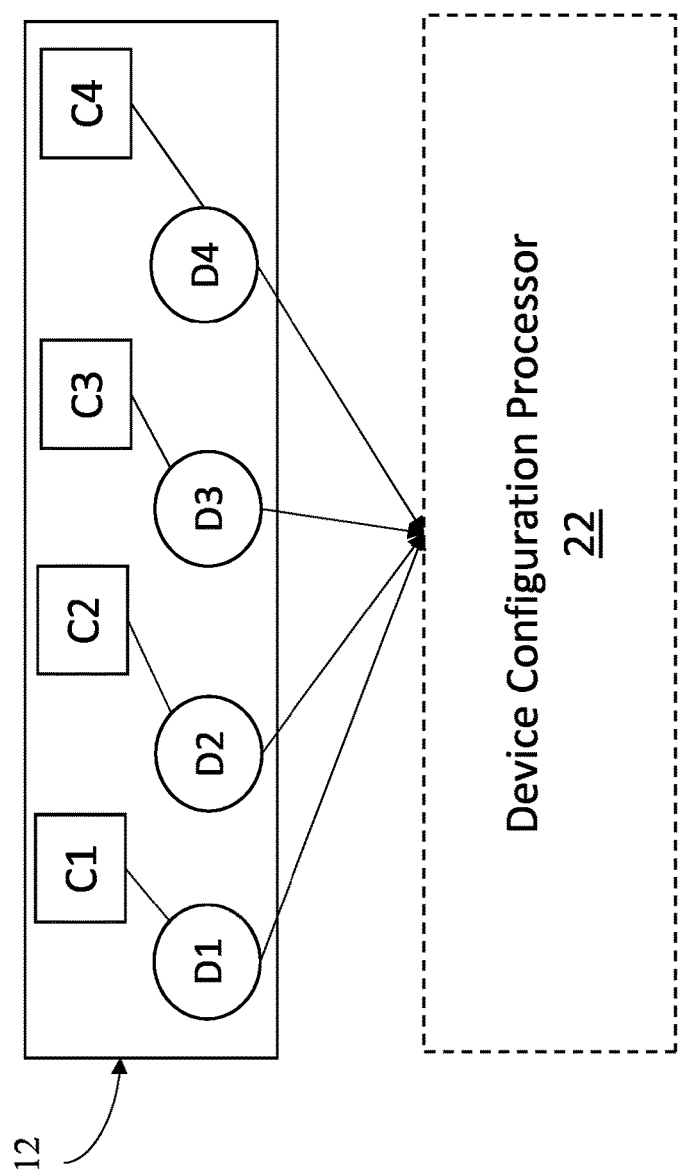
FIG. 3 is a block diagram of a network of daemons configured to monitor components of one or more storage device in accordance with example embodiments disclosed herein.

Referring to FIG. 3, a device configuration processor 22 can be configured to monitor and collect storage device telemetry data. As described herein, the telemetry data can correspond to one or more components C1-C4 of a storage device 12. For example, the components C1-C4 can be any of the elements depicted in storage device 12 of FIG. 1. The device configuration processor 22 can generate daemons D1-D4 (e.g., via the system configuration manager 134 of FIG. 2) configured to monitor and collect data from one or more of the storage device components C1-C4. The processor 22 can assign each daemon D1-D4 to one of the storage device components C1-C4. Additionally, the processor 22 can configure each daemon D1-D4 according to the component it is assigned. As such, each of the daemons D1-D4 can include particular interfaces and/or logic tailored to monitor and collect data from its assigned component. In embodiments, the manager 134 can configure each daemon D1-D4 with a unique syslog tailored to monitor and collect telemetry data from its assigned component C1-C4. Further, the manager 134 can configure each daemon D1-D4 to transmit its syslog to the manager 134 in response to a condition. The condition can be based on a time (e.g., real-time or set intervals) or based on an event. In other embodiments, the manager 134 can configure each daemon D1-D4 to continuously transmit the telemetry data in real-time.

Although FIG. 3 depicts a 1:1 ratio between daemons and components, the manager 134 can generate daemons that are assigned to more than one component. Thus, the manager 134 can implement ratio of daemons and components. In embodiments, the manager can determine a number of daemons to generate based on storage device configurations, number of components, and types of components, amongst other parameters.

Figure 4:
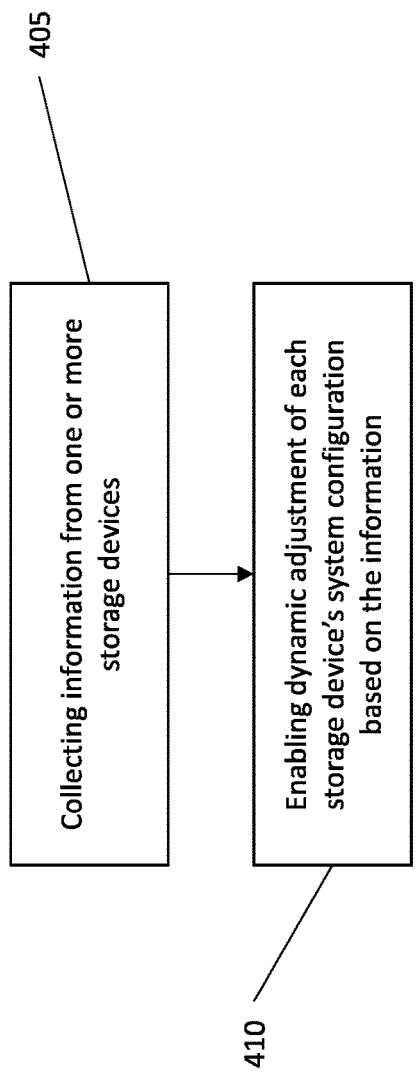
FIG. 4 is a flow diagram of a method for dynamic storage device system configuration adjustment in accordance with example embodiments disclosed herein.

FIG. 4 illustrates a method and/or flow diagram in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the method in accordance with the disclosed subject matter.

Referring to FIG. 4, in embodiments, a method 400 can be executed by, e.g., a device configuration processor (e.g., the device configuration processor 22 of FIG. 1). The method 400, at 405, can include collecting information from one or more storage devices (e.g., the storage device 12 and/or external storage devices 105 of FIG. 1). In embodiments, the information can be collected by configuring each of the storage devices with at least one daemon to monitor one or more components of each storage device. In response to detecting an event, each daemon can report the event to the configuration processor. The components can include one or more of: memory, cache, processors, amongst other storage device components. The method, at 410, can further include enabling dynamic adjustment of each storage device's system configuration based on the information.

Each of the steps can include any of the following as additional primary steps or sub-steps. For example, information patterns can be identified. The patterns can be matched to spikes in data traffic and/or storage device performance. The matched patterns and spikes can be correlated with each storage device's performance and errors. Storage device system configuration adjustment options can be determined. Rules for each option can be generated. Dynamic adjustment of each storage device's system configuration based on the generated one or more rules can be enabled. Patterns within the information can be identified by normalizing the information. Normalizing the information can include identifying each data type included in the formation; and transforming the information corresponding to each data type into a predetermined format. One or more machine learning techniques can be performed on the normalized information. Identifying the patterns within the information includes segmenting the information based on one or more of: time windows, industry of customers associated with each storage device, configuration changes to any storage device component, event notifications, data transfer spikes, and alert notifications, amongst other segmentation parameters.

It should be noted that the method 400 and any of its steps can be performed using any technique described herein, known, and/or yet to be known.

The above-described systems and methods can be implemented in digital electronic circuitry, in computer hardware, firmware, and/or software. The implementation can be as a computer program product. The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the concepts described herein by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random-access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The transmitting device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a Blackberry®.

Comprise, include, and/or plural forms of each are open ended and include the listed parts and can include additional parts that are not listed. And/or is open ended and includes one or more of the listed parts and combinations of the listed parts.

One skilled in the art will realize the concepts described herein may be embodied in other specific forms without departing from the spirit or essential characteristics thereof. The foregoing embodiments are therefore to be considered in all respects illustrative rather than limiting of the concepts described herein. Scope of the concepts is thus indicated by the appended claims, rather than by the foregoing description, and all changes that come within the meaning and range of equivalency of the claims are therefore intended to be embraced therein.

What is claimed is:

1. An apparatus comprising a memory and at least one processor configured to:
   collect information from at least one component of one or more storage devices;
   determine performance changes of the at least one component using the collected information;
   correlate performance changes of components with uncollected information by using the collected information from one or more components neighboring the components with uncollected information; identify patterns within the collected information; and match the patterns to spikes in one or more of data traffic and storage device performance; and enable dynamic adjustment of each storage device's system configuration based on the collected information and the correlated performance changes.

2. The apparatus of claim 1, wherein the information includes one or more of: performance data, telemetry data, system configuration data, component configuration data, change events/commands, and alerts.

3. The apparatus of claim 2, further configured to configure each of the storage devices with at least one daemon to monitor one or more components of each storage device.

4. The apparatus of claim 3, wherein the one or more components include one or more of: memory, cache, processors, amongst other storage device components.

5. The apparatus of claim 1 further configured to:
   correlate the matched patterns and the spikes with one or more of performance and errors of each of the storage devices;
   determine options to adjust system configurations of each of the storage devices;
   generate one or more rules for each of the determined options; and
   enable dynamic adjustment of each storage device's system configuration based on the generated one or more rules.

6. The apparatus of claim 1, wherein identifying patterns within the information includes normalizing the information.

7. The apparatus of claim 6, wherein normalizing the information includes:
   identifying each data type included in the information; and
   transforming the information corresponding to each data type into a predetermined format.

8. The apparatus of claim 6 further configured to perform one or more machine learning techniques to the normalized information.

9. The apparatus of claim 1, wherein identifying the patterns within the information includes segmenting the information based on one or more of: time windows, industry of customers associated with each storage device, configuration changes to any storage device component, event notifications, data transfer spikes, and alert notifications, amongst other segmentation parameters.

10. A method comprising:
    collecting information from at least one component of one or more storage devices;
    determining performance changes of the at least one component using the collected information;
    correlating performance changes of components with uncollected information by using the collected information from one or more components neighboring the components with uncollected information; identifying patterns within the collected information; and matching the patterns to spikes in one or more of data traffic and storage device performance; and enabling dynamic adjustment of each storage device's system configuration based on the collected information and the correlated performance changes.

11. The method of claim 10, wherein the information includes one or more of: performance data, telemetry data, system configuration data, component configuration data, change events/commands, and alerts.

12. The method of claim 11, further comprising configuring each of the storage devices with at least one daemon to monitor one or more components of each storage device.

13. The method of claim 12, wherein the one or more components include one or more of: memory, cache, processors, amongst other storage device components.

14. The method of claim 10 further comprising:
- correlating the matched patterns and the spikes with one or more of performance and errors of each of the storage devices;
- determining options to adjust system configurations of each of the storage devices;
- generating one or more rules for each of the determined options; and
- enabling dynamic adjustment of each storage device's system configuration based on the generated one or more rules.

15. The method of claim 10, wherein identifying patterns within the information includes normalizing the information.

16. The method of claim 15, wherein normalizing the information includes:
- identifying each data type included in the formation; and
- transforming the information corresponding to each data type into a predetermined format.

17. The method of claim 15 further comprising performing one or more machine learning techniques to the normalized information.

18. The method of claim 10, wherein identifying the patterns within the information includes segmenting the information based on one or more of: time windows, industry of customers associated with each storage device, configuration changes to any storage device component, event notifications, data transfer spikes, and alert notifications, amongst other segmentation parameters.

* * * * *